L. W. HURFF.
SEED CORN DRIER.
APPLICATION FILED JAN. 18, 1911.
1,045,407.
Patented Nov. 26, 1912.
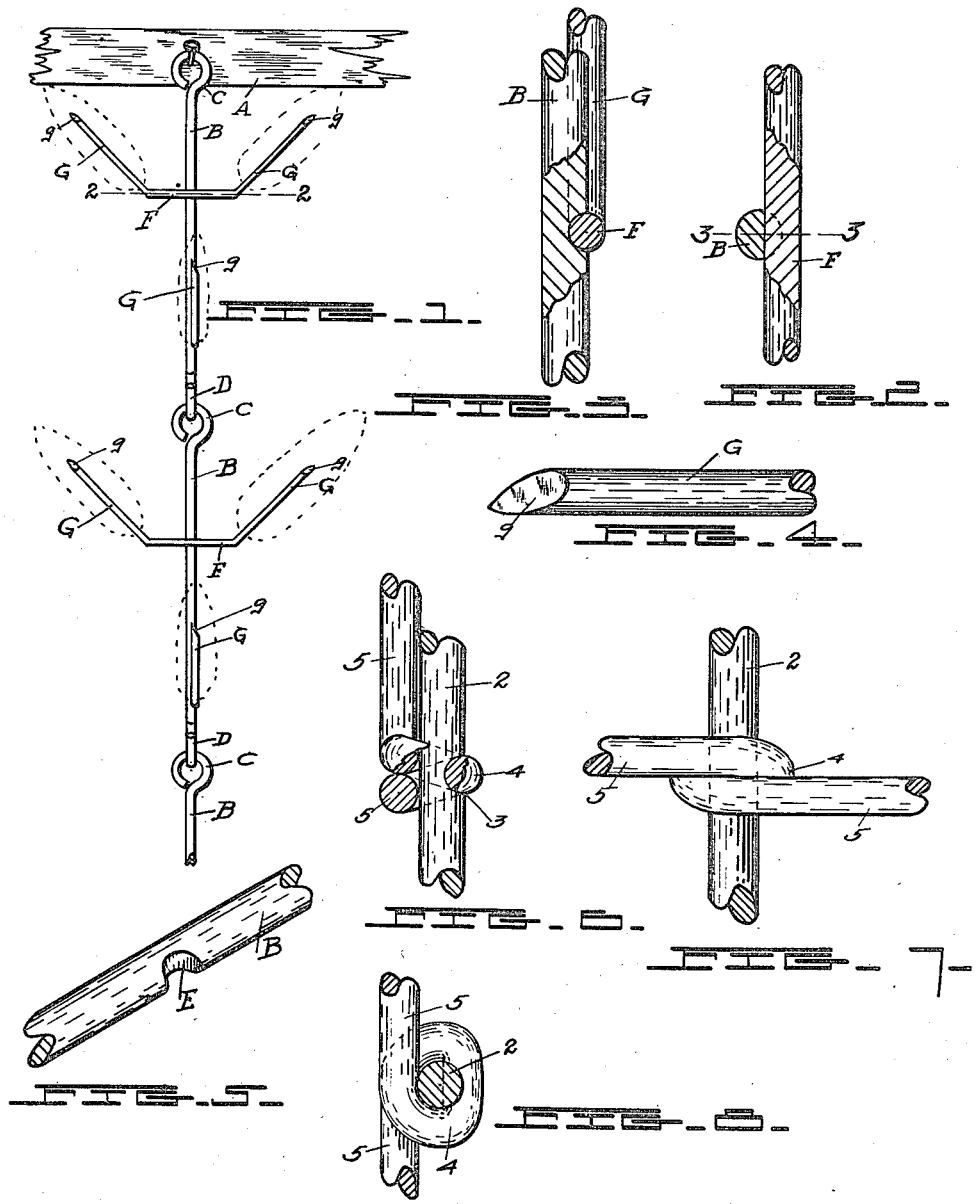

UNITED STATES PATENT OFFICE.

LUCIEN W. HURFF, OF GALESBURG, ILLINOIS.

SEED-CORN DRIER.

1,045,407.   Specification of Letters Patent.   Patented Nov. 26, 1912.

Application filed January 18, 1911. Serial No. 603,407.

*To all whom it may concern:*

Be it known that I, LUCIEN W. HURFF, a citizen of the United States, residing at Galesburg, in the county of Knox and State of Illinois, have invented certain new and useful Improvements in Seed-Corn Driers, of which the following is a specification.

My invention relates to seed corn driers.

The object of my invention is to provide means for supporting ears of corn selected for seed purposes in a separated relation upon impaling prongs that will hold them firmly in place.

A further object of my invention is to divide the hanger into sections, each unit to be any length desired, and provided with impaling prongs in numbers proportionate with the length of each section, each section to be provided at its upper end with an eye or loop and at its lower end with a hook, the eye or loop and hook preferably disposed relatively at right angles.

Another object of my invention is to proportion a suspension rod considerably larger than the wire or bars constituting the impaling means.

Another object of my invention is to utilize the welding method to unite the impaling wires or bars to the hanger stem and in carrying out this method, to make it applicable to the joining of a small wire to a larger one I provide recesses at intervals in the body of the hanger stem in size and shape to adapt it to receive and seat substantially one-half of the circumferential body of the impaling wires or bars, thus forming a support therefor. The hanger stem and impaling wires being in this relation, electric welding process is employed to effect a joining of the meeting parts of the two wires, thus providing a simple and stable structure.

My invention consists in the formation of a corn drier in sections, the individual units thereof formed with an eye or loop at the top and a hook at the bottom and provided intermediate the hook and the eye or loop with pointed impaling prongs.

My invention further consists in recessing the hanger stem at intervals to facilitate the seating of the impaling prongs or cross wires forming the same within said recesses, and then applying the electric welding process to unite them.

In the drawings, Figure 1 is a side elevation showing part of a hanger comprising connected units; Fig. 2 is a top view on the line 2—2 of Fig. 1, with the cross portion of the cross wire broken away to show its relation with the vertical stem; Fig. 3 is a side elevation on the line 3—3 of Fig. 2, showing the connected relation between the cross wire and stem, a portion of the stem being broken away; Fig. 4 is a detail view of the end of a prong showing the finished end cut to a tapered point; Fig. 5 is a perspective view of a section of the hanger stem showing the manner of recessing to form a seat to receive the impaling cross wires; Fig. 6 shows a modified form in which the cross wire is seated in the stem and then wrapped thereabout, a portion of the cross wire being broken away to better show the relation of the parts applied in this form; Fig. 7 is a detail side elevation showing the same form as disclosed in Fig. 6, but viewed at a point rearward of the recess in the stem; and Fig. 8 is a detail top view showing the same character of connection as disclosed in Figs. 6 and 7.

The use of corn hangers has developed the fact that the farmer utilizes normally waste space in which to dry his seed corn, and in about ninety per cent. of the cases of applied use, the hangers are hung in the gables of the various buildings upon the farm. The gable formation provides hanger space proportionately longer from the base of the gable to its apex, consequently all sorts of lengths of hangers are required to fill the space. Considering this fact, sectional hangers in such character of use are very desirable for the reason that the hanger long enough to extend from the apex of the gable to the base of the angle formed by the gable, if provided with impaling prongs in numbers commensurate with the space accommodated in the length of stem to support ears of corn, if loaded would be entirely too heavy and unwieldy to handle, and so also with intermediate lengths of hangers that were suspended at points intermediate the apex and the base of the gable.

In view of the above experience, I have been forced to the production of sectional hangers and find that they are functionally adaptable to uses as they are applied by the farmer and very desirable in dividing the weight so that uniform lengths of sections only need to be handled. Furthermore, I find that by employing sectional hangers, a standard length may be used instead of a